Patented Sept. 27, 1949

2,483,252

UNITED STATES PATENT OFFICE 2,483,252

METHOD FOR PREPARING HYDROXYL-AMMONIUM SALTS OF ORGANIC ACIDS

Philip F. Tryon, Terre Haute, Ind., assignor to Commercial Solvents Corporation, Terre Haute, Ind., a corporation of Maryland No Drawing. Application April 20, 1945, Serial No. 589,455

11 Claims. (Cl. 260—404)

This invention relates to a new method for preparing hydroxylammonium salts of monocarboxylic organic acids. More particularly it relates to a method for preparing such salts from the readily available mineral acid salts of hydroxylamine.

In the past a number of hydroxylammonium salts of organic acids have been prepared by reacting hydroxylamine in water solution with the organic acid whose salt is desired. This method proved unsatisfactory because of the difficulties and losses inherent in handling the unstable hydroxylamine, and the resulting low yields of product.

Another prior art method involved the reaction of a mineral acid salt of hydroxylamine such as hydroxylammonium sulfate with the barium salt of an organic acid, for example, barium acetate, in water solution. This procedure depended upon the precipitation of the insoluble barium sulfate, and after its removal, the recovery of the hydroxylammonium salt of the organic acid from solution. This procedure likewise proved unsatisfactory as the hydroxylammonium salts of organic acids tend in general, to be extremely soluble in water, so that recovery by crystallization is difficult and unpracticable, while recovery by evaporation resulted in products of extremely low purity.

I have now found that crystalline hydroxylammonium salts of monocarboxylic organic acids can be prepared according to my invention wherein the chloride or sulfate of hydroxylamine is caused to react in a lower aliphatic alcohol medium with an ammonium salt or an alkali metal salt of a monocarboxylic organic acid.

Among the hydroxylammonium salts of monocarboxylic organic acids which can be prepared according to my invention there may be mentioned, hydroxylammonium acetate, hydroxylammonium propionate, hydroxylammonium butyrate, hydroxylammonium valerate, hydroxylammonium caproate, hydroxylammonium lactate, hydroxylammonium myristate, hydroxylammonium benzoate, hydroxylammonium chloroacetate, hydroxylammonium bromobenzoate, hydroxylammonium salicylate, and the like.

In carrying out my invention I mix the hydroxylammonium chloride or sulfate, with a lower aliphatic alcohol. The chloride or sulfate partially dissolves in the alcohol and agitation may be resorted to, to keep the undissolved salt in suspension. To this solution or suspension is added, preferably gradually and with agitation, the ammonium or alkali metal salt of the appropriate monocarboxylic organic acid, either alone or previously dissolved or suspended in an alcohol. The temperature is preferably maintained at a mildly elevated value, usually in the neighborhood of between 40–70 C. to maintain at least partial solution and to promote the reaction. Upon substantial completion of reaction, the mixture is cooled to promote precipitation of the ammonium or alkali metal salt of the mineral acid radical, but not sufficiently to permit crystallization of the hydroxylammonium salt of the monocarboxylic organic acid. The salt of the mineral acid is removed, as by filtration, and the hydroxylammonium salt of the monocarboxylic organic acid is recovered from the filtrate, for example by further cooling the filtrate, or by concentrating and cooling the filtrate.

The ammonium or alkali metal salt of the organic acid may be added to the reaction mixture as such, or may be prepared in situ in the mixture by the addition of the organic acid and the ammonia, or the addition of organic acid and the ammonium or alkali metal hydroxide to the mixture.

My reaction is carried out in an alcoholic medium which may contain small quantities of water in the mixture if desired, for example up to about 20% water and in the case of the sulfate these small quantities of water are beneficial in increasing the solubility of the hydroxylammonium sulfate in the medium. Care should be taken, however, not to add enough water to appreciably increase the solubility of the hydroxylammonium salt of the organic acid in the medium. The solubility of the hydroxylammonium salt of the organic acid in the particular alcoholic mixture should be low enough to permit ready crystallization at temperatures down to about 0° C.

The following examples will further illustrate my invention:

Example I

A 154 gram portion of ammonium acetate, was mixed with and partially dissolved in 200 ml. of ethanol at about 60° C., and this suspension was added to a mixture of 142 grams of 98% hydroxylammonium chloride and 400 ml. of ethanol at 60° C. The mixture was stirred for forty-five minutes at 50–60° C. and then filtered to remove the precipitated ammonium chloride. The precipitate was washed with 100 ml. of hot ethanol. The combined filtrate and wash were cooled to 10° C. which caused the hydroxylammonium acetate to crystallize. The crystals were filtered off and dried in a vacuum over phosphorus pentoxide. The yield was 166 grams of white crystals having a purity of 90.4%, or 81% of theoretical yield based on 100% material. Another 15% of the hydroxylammonium acetate remained in the mother liquor and could be recovered by further crystallization if desired.

Example II

A mixture was prepared of 71 grams of 98% hydroxylammonium chloride and 500 ml. of 90% 2-propanol at 70° C. To this mixture was added gradually, with stirring, 77 grams of ammonium acetate over a period of thirty minutes. The reaction mixture was stirred for one hour more at 60–65° C., then cooled to 20° C. to precipitate the ammonium chloride, which was filtered and washed with 50 ml. of 90% 2-propanol. The filtrate was concentrated at 100 mm. pressure and 40° C. to a weight of 290 grams, cooled to 5° C., and the crystals of hydroxylammonium acetate which formed were filtered off. The yield was 64 grams of 88.6% hydroxylammonium acetate or 61% of theoretical based on 100% material. The mother liquor contained 33% of the theoretical yield of hydroxylammonium acetate.

Example III

Six hundred and fifty-six grams of hydroxylammonium sulfate were pulverized and added to a stirred mixture of 512 ml. of acetic acid and 1600 ml. of methanol. To this mixture was then added dropwise while stirring, a solution of 336 grams of sodium hydroxide in 320 ml. of water over a period of one hour. The mixture was stirred for two hours at 40–50° C., when 800 ml. of methanol were added, the mixture cooled to 30° C. to precipitate more completely the sodium sulfate which was then filtered under vacuum, and washed with 200 ml. of methanol. The combined filtrate and wash was concentrated under vacuum at a temperature of 55° C. to a weight of 971 grams. The concentrate was cooled to 10° C. to precipitate the hydroxylammonium acetate. The crystal-containing slurry was then centrifuged, and the crystalline product recovered and air dried. The yield was 313 grams of 96.5% hydroxylammonium acetate or 41.5% based on the hydroxylamine content of the crystals. The mother liquor contained an additional 53.4% of hydroxylammonium acetate.

Example IV

One thousand and eighty-eight grams of sodium acetate trihydrate (8.0 moles) were dissolved in a solution of 1600 ml. of methanol, 240 ml. of water, and 47 ml. of acetic acid (0.8 mole), and 656 grams of pulverized hydroxylammonium sulfate (8.0 equivalents) were added to the stirred solution over a period of one-half hour at a temperature of 50° C. The suspension of crystals was stirred for two and one-half hours more at 50° C., cooled to 30° C., and filtered. The filter-cake was washed with 200 ml. of methanol, and the combined filtrate and wash was concentrated at 53° C., under vacuum, to a final weight of 1120 grams. The concentrate was cooled to 10° C., centrifuged, and the crystals were air-dried. The yield was 266 grams of 96.6% hydroxylammonium acetate; or 35.5%, based on the hydroxylamine content of the crystals. The mother liquor contained 41.7% of hydroxylammonium acetate.

Example V

A solution of 210 grams of hydroxylammonium chloride (3.0 moles) and 190 ml. of acetic acid (3.3 moles) in 500 ml. of methanol was neutralized dropwise, at 50° C., with a solution of 198 grams of 85% potassium hydroxide (3.0 moles) in 600 ml. of methanol. The mixture was stirred for one hour at 50° C., cooled, and filtered. The filtrate from the potassium chloride was concentrated at 45° C. under vacuum, cooled to 20° C., and filtered. The crystals were washed with methanol and air-dried; yield 125 grams, about 43%. The mother liquor and wash were reconcentrated, cooled and filtered. The second-crop crystals were washed with methanol and air-dried. The yield was 53 grams of 92% hydroxylammonium acetate, or 18%. The final mother liquor and wash still contained 19% on the yield.

Example VI

A suspension of ammonium chloroacetate was prepared by passing one and one-tenth moles of ammonia, 18.5 grams into a solution of one mole of Eastman Practical chloroacetic acid, 93 grams, in 300 ml. of ethanol, at 20–30° C. This suspension was added to one mole of 98% hydroxylammonium chloride, 71 grams, partly dissolved in 300 ml. of ethanol at 60° C. The reaction mixture was stirred at 55–60° C. for one hour, then cooled to 20° C. and filtered. The air-dry precipitate of ammonium chloride weighed 47 grams; theoretical, 52.5 grams. It contained 1% of the hydroxylamine used. The filtrate was concentrated at 100 mm. pressure to a weight of 280 grams and allowed to crystallize. The crystals were filtered at 20° C., and washed with 50 ml. of ethanol. The yield was 117 grams of white crystals which assayed 93.4%, or 86% of theoretical based on 100% material. The filtrate still contained 13% of the theoretical yield. Eighty grams of the product were recrystallized from 120 ml. of ethanol at 60° C. The undissolved material was filtered off, and the crystals which separated from the solution were filtered at 25° C. and washed with 30 ml. of ethanol. The yield was 48 grams of crystals which analyzed 100% pure, a recovery of about 65%.

Example VII

A solution of ammonium propionate was prepared by passing one and one-tenth moles of ammonia, 18.5 grams, into a solution of one mole of refractionated propionic acid, 74 grams, and 200 ml. of ethanol, at 20–25° C. This solution was added to one mole of 98% hydroxylammonium chloride, 71 grams, partly dissolved in 500 ml. of ethanol at 60° C. The mixture was stirred for one hour at 50–55° C., cooled to 5° C., and filtered. The air-dry ammonium chloride precipitate weighted 53.5 grams; theoretical 52.5 grams. The filtrate was concentrated at 100 mm. pressure and 40° C. liquid temperature to a weight of 183 grams, cooled to 5° C., and the white crystals were filtered off. The yield was 49 grams of 92.2% hydroxylammonium propionate, or 42% based on 100% material. The mother liquor still contained 31% of the theoretical yield.

Example VIII

One-third mole of 98% hydroxylammonium chloride, 23.3 grams, was partly dissolved in a stirred solution of one-third mole of Eastman myristic acid in 400 ml. of ethanol at 55–60° C. At this temperature, 0.35 mole of ammonia was passed in over a period of thirty minutes. The mixture was stirred for another thirty minutes while the temperature was lowered to 40° C. The precipitated ammonium chloride was filtered, and washed with 20 ml. of ethanol. Air-dry, it weighed 16 grams; theoretical 17.5 grams. It contained 1% of the hydroxylamine used. The filtrate and wash were cooled to 10° C., and the crystals were filtered off. The yield was 63 grams of 99.4% hydroxylammonium myristate, or 72% of theoretical based on 100% material. The M. P. was 65° C.; literature 69° C. The filtrate still contained 14% of the theoretical yield of product.

*Example IX*

One mole of 98% hydroxylammonium chloride, 71 grams, was partly dissolved in a solution of one mole of benzoic acid, 122 grams, in 600 ml. of ethanol at 50–55° C. One and one-tenth moles of ammonia, 18.5 grams, were passed into the stirred mixture at this temperature, over a period of one and one-half hours. The mixture was filtered at 45° C., and the precipitate washed with 50 ml. of ethanol. The air-dry ammonium chloride weighed 43 grams; theoretical 52.5 grams. It retained 0.5% of the hydroxylamine used. The filtrate started to crystallize at about 40° C.; it was cooled to 10° C., and the white crystals were filtered off and washed with 50 ml. of cold ethanol. The yield was 104 grams of 90.1% material, or 61% of theoretical based on 100% material. The filtrate still contained 27% of the theoretical yield. Chloride analysis showed that the crystals contained 4.9% of ammonium chloride impurity.

While the above describes the preferred embodiments of my invention, it will be understood that departures may be made therefrom within the scope of the specification and claims.

What is claimed is:

1. In the preparation of hydroxylammonium salts of organic monocarboxylic acids, the process which comprises reacting a hydroxylammonium salt of a mineral acid selected from the group consisting of hydroxylammonium chloride and hydroxylammonium sulfate in a lower aliphatic alcoholic medium with a salt of an organic acid selected from the group consisting of ammonium salts and alkali metal salts of alkanoic acids, phenylalkanoic acids, and the halogen-substituted, hydroxyl-substituted, and keto-substituted derivatives thereof, removing the resulting inorganic salt from the reacting mixture, cooling to crystallize the hydroxylammonium salt and recovering the latter.

2. In the preparation of hydroxylammonium salts of monocarboxylic organic acids, the process which comprises reacting a hydroxylammonium salt of a mineral acid selected from the group consisting of hydroxylammonium chloride and hydroxylammonium sulfate in a lower aliphatic alcoholic medium with an ammonium salt of a monocarboxylic organic acid selected from the group consisting of alkanoic acids, phenylalkanoic acids, and the halogen-substituted, hydroxyl-substituted, and keto-substituted derivatives thereof removing the resulting ammonium salt from the reaction mixture, cooling to crystallize the hydroxylammonium salt and recovering the latter.

3. In the preparation of hydroxylammonium salts of monocarboxylic organic acids, the process which comprises reacting a hydroxylammonium salt of a mineral acid selected from the group consisting of hydroxylammonium chloride and hydroxylammonium sulfate in a lower aliphatic alcoholic medium with an alkali metal salt of a monocarboxylic organic acid selected from the group consisting of alkanoic acids, phenylalkanoic acids, and the halogen-substituted, hydroxyl-substituted, and keto-substituted derivatives thereof removing the resulting alkali metal salt from the reaction mixture, cooling to crystallize the hydroxylammonium salt and recovering the latter.

4. In the preparation of hydroxylammonium salts of monocarboxylic organic acids the process which comprises reacting hydroxylammonium chloride in a medium comprising a lower aliphatic alcohol with a salt of an organic acid selected from the group consisting of ammonium salts and alkali metal salts of monocarboxylic organic acids selected from the group consisting of alkanoic acids, phenylalkanoic acids, and the halogen-substituted, hydroxyl-substituted, and keto-substituted derivatives thereof, removing the resulting chloride from the reaction mixture, cooling to crystallize the hydroxylammonium salt and recovering the latter.

5. In the preparation of hydroxylammonium salts of monocarboxylic organic acids the process which comprises reacting hydroxylammonium sulfate in a medium comprising a lower aliphatic alcohol with a salt of an organic acid selected from the group consisting of ammonium salts and alkali metal salts of monocarboxylic organic acids selected from the group consisting of alkanoic acids, phenylalkanoic acids, and the halogen-substituted, hydroxyl-substituted, and keto-substituted derivatives thereof, removing the resulting sulfate from the reaction mixture, cooling to crystallize the hydroxylammonium salt and recovering the latter.

6. In the preparation of hydroxylammonium acetate, the process which comprises reacting a hydroxylammonium salt of a mineral acid selected from the group consisting of hydroxylammonium chloride and hydroxylammonium sulfate in a medium comprising a lower aliphatic alcohol with an acetate selected from the group consisting of ammonium acetate and alkali metal acetates, removing the resulting inorganic salt from the reaction mixture, cooling to crystallize the hydroxylammonium acetate and recovering the latter.

7. In the preparation of hydroxylammonium acetate, the process which comprises reacting hydroxylammonium chloride in a medium comprising a lower aliphatic alcohol, with ammonium acetate, removing the resulting ammonium chloride from the reaction medium, cooling to crystallize the hydroxylammonium acetate and recovering the latter.

8. In the preparation of hydroxylammonium myristate, the process which comprises reacting a hydroxylammonium salt of a mineral acid selected from the group consisting of hydroxylammonium chloride and hydroxylammonium sulfate in a medium comprising a lower aliphatic alcohol with a salt of an organic acid selected from the group consisting of ammonium myristate and alkali metal myristates, removing the resulting inorganic salt from the reaction medium, cooling to crystallize the hydroxylammonium myristate and recovering the latter.

9. In the preparation of hydroxylammonium benzoate, the process which comprises reacting a hydroxylammonium salt of a mineral acid selected from the group consisting of hydroxylammonium chloride and hydroxylammonium sulfate in a medium comprising a lower aliphatic alcohol with a salt of an organic acid selected from the group consisting of ammonium benzoate and alkali metal benzoates, removing the resulting inorganic salt from the reaction mixture, cooling to crystallize the hydroxylammonium benzoate and recovering the latter.

10. In the preparation of hydroxylammonium salts of organic monocarboxylic acids, the process which comprises mixing a hydroxylammonium salt, selected from a class consisting of hydroxylammonium sulfate and chloride, with a salt of an organic acid, selected from a class consisting of ammonium and alkali metal salts of alkanoic acids, phenylalkanoic acids, and halogen-substituted, hydroxyl-substituted, and keto-substituted derivatives thereof, in a low molecular aliphatic alcohol reaction medium and, following the resulting double-decomposition reaction, subjecting the resulting reaction mixture to a fractional crystallization in which the resulting inorganic salt is first precipitated and removed and then the hydroxylammonium salt is crystallized and recovered.

11. The process of claim 10 wherein hydroxylamine sulfate is employed and the reaction medium contains a small amount of added water not substantially exceeding 20 per cent by weight.

PHILIP F. TRYON.

REFERENCES CITED

The following references are of record in the file of this patent:

UNITED STATES PATENTS

| Number | Name | Date |
|---|---|---|
| 1,390,260 | Sulzberger | Sept. 6, 1921 |
| 1,645,265 | Hochstetter | Oct. 11, 1927 |
| 1,920,137 | Bruson | July 25, 1933 |
| 2,102,103 | Urbain et al. | Dec. 14, 1937 |
| 2,283,977 | Dreyfus | May 26, 1942 |

OTHER REFERENCES

"Organic Syntheses," L. I. Smith, vol. 22 (1942). J. Wiley & Sons; pages 26-27.